US012679418B2

(12) United States Patent
An et al.

(10) Patent No.: US 12,679,418 B2
(45) Date of Patent: Jul. 14, 2026

(54) DYNAMIC AUTOMATION LEVEL-BASED AUTONOMOUS DRIVING SYSTEM AND METHOD

(71) Applicant: ELECTRONICS AND TELECOMMUNICATIONS RESEARCH INSTITUTE, Daejeon (KR)

(72) Inventors: Kyoung Hwan An, Daejeon (KR); Ki Tae Kim, Daejeon (KR); Jinwoo Kim, Daejeon (KR); Myungwook Park, Daejeon (KR); Myungln Ji, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 65 days.

(21) Appl. No.: 18/895,982

(22) Filed: Sep. 25, 2024

(65) Prior Publication Data

US 2025/0115281 A1 Apr. 10, 2025

(30) Foreign Application Priority Data

Oct. 6, 2023 (KR) ........................ 10-2023-0133241
Sep. 12, 2024 (KR) ........................ 10-2024-0124404

(51) Int. Cl.
*B60W 60/00* (2020.01)
*B60W 30/12* (2020.01)
(Continued)

(52) U.S. Cl.
CPC ........ *B60W 60/0018* (2020.02); *B60W 30/12* (2013.01); *B60W 30/146* (2013.01);
(Continued)

(58) Field of Classification Search
CPC ............. B60W 60/0018; B60W 30/12; B60W 30/146; B60W 30/182; B60W 2556/45;
(Continued)

(56) References Cited

U.S. PATENT DOCUMENTS 12,005,934 B2 * 6/2024 Koda ................. G08G 1/09685
2015/0336576 A1 11/2015 Sung et al.
(Continued)

FOREIGN PATENT DOCUMENTS

JP 2580978 Y2 9/1998
KR 10-2303716 B1 9/2021
(Continued)

OTHER PUBLICATIONS

Leo Mendiboure et al., Operational Design Domain for Automated Driving Systems: Taxonomy Definition and Application, Jul. 27, 2023, IEEE, pp. 1-6 (pdf).*

*Primary Examiner* — Manglesh M Patel
(74) *Attorney, Agent, or Firm* — LRK PATENT LAW FIRM

(57) ABSTRACT

Provided is a dynamic automation level-based autonomous driving system and a method thereof, and more particularly, an autonomous driving system that preferentially performs maximum autonomous driving based on a dynamic automation level in bad weather and irregular road environments and a method thereof. The dynamic automation level-based autonomous driving system includes a route server configured to generate operational design domain determination information and to plan a global route so that an automated driving mode is preferenced, and an autonomous vehicle configured to drive along the global route, to change automation levels by using multi-layer operational design domain definition information and driving situation monitoring information, and to perform autonomous driving.

10 Claims, 13 Drawing Sheets

INFRASTRUCTURE EDGE RSU PROVIDED WITH WEATHER SENSOR TRANSMITS WEATHER INFORMATION/ROAD SURFACE INFORMATION TO SERVER

(51) Int. Cl.
 B60W 30/14 (2006.01)
 B60W 30/182 (2020.01)
 H04W 4/44 (2018.01)

(52) U.S. Cl.
 CPC ............ B60W 30/182 (2013.01); H04W 4/44 (2018.02); B60W 2555/20 (2020.02); B60W 2556/45 (2020.02)

(58) Field of Classification Search
 CPC ....... B60W 2555/20; B60W 60/00182; B60W 60/00184; H04W 4/44; G05D 1/0061; G05D 1/0088; G05D 1/021; G05D 1/0214; G05D 1/0221; G05D 1/0223; B60K 28/00–165
 USPC ...................................................... 701/23.25
 See application file for complete search history.

(56) References Cited

U.S. PATENT DOCUMENTS

| | | | | | |
|---|---|---|---|---|---|
| 2018/0113460 | A1* | 4/2018 | Koda | ................. | G08G 1/09685 |
| 2019/0041850 | A1* | 2/2019 | Chase | ................. | G08G 1/0967 |

| | | | | | |
|---|---|---|---|---|---|
| 2019/0354101 | A1* | 11/2019 | Sujan | ...................... | G08G 1/22 |
| 2020/0116515 | A1* | 4/2020 | Chadha | ............. | G01C 21/3691 |
| 2020/0166951 | A1 | 5/2020 | Choi | | |
| 2020/0239023 | A1* | 7/2020 | Srinivasan | .......... | G05D 1/0027 |
| 2022/0032955 | A1* | 2/2022 | Xiang | ................ | B60W 50/029 |
| 2022/0135070 | A1* | 5/2022 | Jung | ................ | B60W 60/0053 |
| | | | | | 701/23 |
| 2022/0242447 | A1* | 8/2022 | Nagura | ..................... | G08G 1/09 |
| 2022/0289252 | A1* | 9/2022 | Liu | .................. | G08G 1/096741 |
| 2023/0140569 | A1* | 5/2023 | Foster | ................. | B60W 30/146 |
| | | | | | 701/400 |
| 2023/0150541 | A1* | 5/2023 | Foster | ................. | B60W 60/001 |
| | | | | | 701/24 |
| 2023/0367309 | A1* | 11/2023 | Patel | .................... | G05D 1/0027 |
| 2024/0124032 | A1* | 4/2024 | Choi | .................... | B60W 40/08 |
| 2024/0328822 | A1* | 10/2024 | Fu | ....................... | G01C 21/3889 |
| 2025/0074453 | A1* | 3/2025 | Sethu | ................. | B60W 60/001 |
| 2025/0128729 | A1* | 4/2025 | Nouri | .................... | B60W 50/14 |
| 2025/0136153 | A1* | 5/2025 | Tang | ........................ | G08G 1/01 |
| 2025/0368226 | A1* | 12/2025 | Nouri | ................ | B60W 60/0015 |

FOREIGN PATENT DOCUMENTS

| | | | |
|---|---|---|---|
| KR | 10-2021-0148518 | A | 12/2021 |
| KR | 10-2022-0083878 | A | 6/2022 |

* cited by examiner

FIG. 10

| Automation Level | 3 | | Degradation | Normal |
|---|---|---|---|---|
| Category:Road | | | | |
| Attribute | Sub-attribute | Condition | Capability | Limited Function |
| . . . | | | | |
| Road Surface | Pavement | Asphalt | Y | – |
| | | Dirt | N | – |
| | Construction | Normal | Y | – |
| | | Under Construction | N | – |
| | Road mark | Clear | Y | – |
| | | Not Visible | N | – |
| . . . | | | | |
| Category:Environment | | | | |
| Attribute | Sub-attribute | Condition | Capability | Limited Function |
| Weather | Rain | < 10 mm/h | Y | – |
| | Snow | < 10 mm/h | Y | – |
| . . . | | | | |

FIG. 11

| Automation Level | 3 | | Degradation | Degraded 1 |
|---|---|---|---|---|
| Category:Road | | | | |
| Attribute | Sub-attribute | Condition | Capability | Limited Function |
| . . . | | | | |
| Road Surface | Pavement | Asphalt | Y | – |
| | | Dirt | N | – |
| | Construction | Normal | Y | – |
| | | Under Construction | N | – |
| | Road mark | Clear | Y | – |
| | | Not Visible | N | – |
| . . . | | | | |
| Category:Environment | | | | |
| Attribute | Sub-attribute | Condition | Capability | Limited Function |
| Weather | Rain | < 10 mm/h | Y | – |
| | | < 30 mm/h | Y | 80% of Max speed |
| | Snow | < 10 mm/h | Y | – |
| . . . | | | | |

FIG. 12

| Automation Level | 2 | | Degradation | Degraded |
|---|---|---|---|---|
| Category:Road | | | | |
| Attribute | Sub-attribute | Condition | Capability | Limited Function |
| . . . | | | | |
| Road Surface | Pavement | Asphalt | Y | – |
| | | Dirt | N | 50% of Max speed |
| | Construction | Normal | Y | – |
| | | Under Construction | N | Speed < 30km/h |
| | Road mark | Clear | Y | – |
| | | Not Visible | N | 50% of Max speed |
| . . . | | | | |
| Category:Environment | | | | |
| Attribute | Sub-attribute | Condition | Capability | Limited Function |
| Weather | Rain | < 10 mm/h | Y | – |
| | | < 30 mm/h | Y | – |
| | Snow | < 10 mm/h | Y | – |
| | | < 20 mm/h | Y | No lane change |
| . . . | | | | |

DYNAMIC AUTOMATION LEVEL-BASED AUTONOMOUS DRIVING SYSTEM AND METHOD

CROSS-REFERENCE TO RELATED APPLICATION(S)

This application claims priority to and the benefit under 35 USC § 119 of Korean Patent Application No. 10-2023-0133241 filed on Oct. 6, 2023, and Korean Patent Application No. 10-2024-0124404 filed on Sep. 12, 2024, in the Korean Intellectual Property Office, the entire disclosures of which are incorporated herein by reference for all purposes.

BACKGROUND

1. Technical Field

The present disclosure relates to dynamic automation level-based autonomous driving system and method, and more particularly, to an autonomous driving system that preferentially performs maximum autonomous driving based on a dynamic automation level in bad weather and irregular road environments and a method thereof.

2. Description of Related Art

According to the related art, since autonomous driving is performed within a fixed single-layer operational design domain in normal situations (normal road conditions and weather conditions), the accuracy of recognition/determination related to whether the current situation is within an operational design domain in various environments (for example, irregular road environments such as bad weather conditions and road construction situations) is low. In addition, even in the case of recognizing/determining whether the current situation is within the operational design domain, there is a problem in that autonomous driving is stopped because the control is transferred to a driver due to the aforementioned single-layer operational design domain structure despite the environment in which the autonomous driving can be maintained.

SUMMARY

Various embodiments are directed to providing autonomous driving system and method capable of monitoring in real-time bad weather environments or irregular road environments, planning a route that allows autonomous driving as much as possible before the start of driving in consideration of an operational design domain, and dynamically changing an automation level during the autonomous driving, thereby determining a driving strategy to maximally maintain autonomous driving.

The present disclosure relates to a dynamic automation level-based autonomous driving system and a method thereof, and more particularly, to an autonomous driving system that preferentially performs maximum autonomous driving based on a dynamic automation level in bad weather and irregular road environments and a method thereof.

A dynamic automation level-based autonomous driving system according to the present disclosure includes: a route server configured to generate operational design domain determination information and to plan a global route so that an automated driving mode is preferred; and an autonomous vehicle configured to drive along the global route, to change automation levels by using multi-layer operational design domain definition information and driving situation monitoring information, and to perform autonomous driving.

The route server receives the multi-layer operational design domain definition information and destination information from the autonomous vehicle, and plans the global route.

The route server generates the operational design domain determination information by using basic information received from at least one of an infrastructure edge roadside unit, a preceding vehicle, and an external agency server.

The basic information includes at least one of weather information, road construction information, and road surface condition information.

The route server transmits an expected automation level for each link to the autonomous vehicle.

The autonomous vehicle monitors in real-time whether a current driving situation falls within an operational design domain by using a weather sensor.

When it is confirmed that automation conditions are changed, the autonomous vehicle performs autonomous driving by changing the automation levels.

The autonomous vehicle performs autonomous driving by determining a degraded automated driving mode set for each of the automation levels.

A dynamic automation level-based autonomous driving method according to the present disclosure includes: (a) planning, by a route server, a global route so that an automated driving mode is preferred; and (b) monitoring, by an autonomous vehicle, a driving situation while driving along the global route, and performing autonomous driving while changing an automation level in consideration of a multi-layer operational design domain.

In (a), the global route is planned by confirming destination setting information, maximum autonomous driving route search option selection information, and definition information on the multi-layer operational design domain.

In (a), operational design domain determination information is generated using weather information and irregular road information, and the global route is planned using a cost calculation logic.

In (a), information on the global route including an automation level corresponding to a link is transmitted to the autonomous vehicle.

In (b), the automation level is determined using weather information acquired using a weather sensor installed in the autonomous vehicle, road information acquired using a recognition sensor installed in the autonomous vehicle, weather information received from an infrastructure, and road information received from the infrastructure.

In (b), the determined automation level is transmitted to the route server to be used for a route search request of a following vehicle.

In (b), the autonomous driving is performed by determining a degraded automated driving mode set in advance in relation to the automation level.

A dynamic automation level-based autonomous vehicle according to the present disclosure includes: an input unit configured to receive global route information; a memory configured to store a program for performing autonomous driving by using the global route information; and a processor configured to execute the program, wherein the processor determines an automation level and whether to execute a degraded automated driving mode according to a result of determining an operational design domain monitored in a process of performing the autonomous driving.

The input unit receives weather information and road condition information acquired by a sensor installed in the vehicle and an external infrastructure, and the processor generates an operational design domain determination result by using the weather information and the road condition information.

The processor transmits the operational design domain determination result to a route server having transmitted the global route information.

The processor determines whether to execute the degraded automated driving mode that limits a driving speed, by using the operational design domain determination result.

The processor determines whether to execute the degraded automated driving mode that prohibits a lane change function, by using the operational design domain determination result.

Existing autonomous driving systems have a problem in that autonomous driving is not continued when exiting an operational design domain in bad weather environments or irregular road environments because an automation level is fixed. However, the present disclosure can solve the problem of stopped autonomous driving.

According to the present disclosure, a route setting server sets a driving route to a predicted section where autonomous driving is maximally possible before the start of driving by utilizing operational design domain determination information (weather information, construction information, and the like), ascertains in real-time weather information of a current driving location by utilizing an infrastructure edge road side unit (RSU) or a weather sensor installed in a vehicle, and performs dynamic change to an accurate automation level, thereby obtaining the effect of safely continuing autonomous driving.

The present disclosure has the effect of efficiently collecting and learning data for object recognition learning using a recognition sensor by quantitatively automatically labeling weather-related information for sensor data using a weather sensor.

Effects of the present disclosure are not limited to the aforementioned effects, and other effects not described above may be evidently understood by a person having ordinary knowledge in the art from the following description.

BRIEF DESCRIPTION OF THE DRAWINGS

FIG. 10 illustrates operational design domain definition information in an automation level 3 normal function.

FIG. 11 illustrates operational design domain definition information indicating conditions in which degraded driving is possible at automation level 3.

FIG. 12 illustrates operational design domain definition information indicating conditions in which degraded driving is possible at automation level 2.

DETAILED DESCRIPTION

Figure 1:
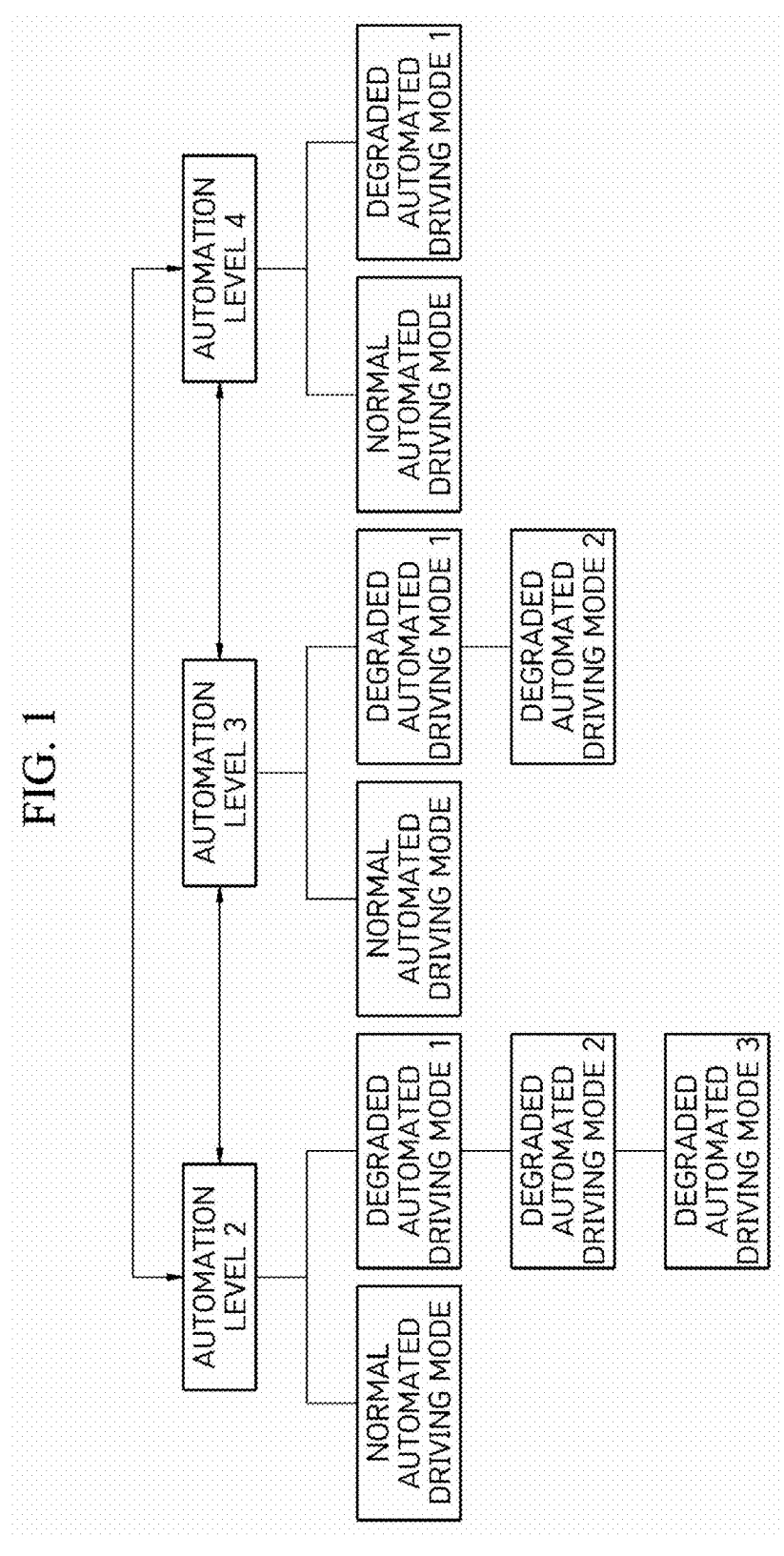
FIG. 1 illustrates an automation level according to embodiments of the present disclosure.

The above-described purpose, other purposes, advantages, and characteristics of the present disclosure and a method for achieving them will become apparent from the embodiments described in detail below in conjunction with the accompanying drawings.

However, the present disclosure is not limited to the disclosed embodiments, but may be implemented in various different forms. The embodiments below are merely provided to easily inform a person having ordinary knowledge in the art to which the present disclosure pertains of the purpose, structure, and effect of the disclosure, and the scope of the present disclosure is defined by the description of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements, steps, operations, and/or elements in addition to a mentioned element, step, operation, and/or element.

Hereinafter, a proposed background of the present disclosure is first described and preferred embodiments of the present disclosure are then described.

The autonomous driving system according to the related art is designed to perform autonomous driving within a fixed single-layer operational design domain (ODD) under normal road and weather conditions. However, during the autonomous driving, bad weather conditions or irregular road conditions, (for example, road construction situations or the like) other than normal road and weather conditions, occur. In such cases, since it is difficult to accurately recognize and determine whether the current situation is within the operational design domain or exits the operational design domain, there is a problem in that safe autonomous driving is not guaranteed. Even when it is determined whether the current situation is within the operational design domain in such a situation, when an automation level is lowered (driver response conditions) or some autonomous driving functions are restricted due to the fixed single-layer operational design domain structure, since the control is transferred to a driver even though the autonomous driving could be maintained, there is a problem in that autonomous driving is stopped.

In an autonomous driving system according to the related art, when a bad weather situation (rain, snow, fog, or the like) occurs during autonomous driving or an irregular road situation (situation where a road structure such as lanes is not known due to construction) occurs, a driver determines whether the current driving environment is within an operational design domain and decides whether to transfer control. Therefore, there is a problem in that it is difficult to automatically respond to changes in the driving environment and continuously maintain an autonomous driving state without the intervention of the driver.

According to the related art, when weather data is collected only with a recognition sensor (Lidar, radar, camera, or the like) for autonomous driving, there is a problem in that it is difficult to automatically label quantitative values (precipitation, snowfall, visibility distance, or the like) for the severity of bad weather and to infer the type and severity level of bad weather during driving.

The present disclosure is proposed to solve the above-mentioned problem, and controls autonomous driving by utilizing a weather sensor. According to embodiments of the present disclosure, in addition to autonomous driving recognition sensors such as cameras, Lidars, and radars, a weather sensor capable of detecting rain, snow, fog, or the like is installed in an infrastructure edge road side unit (RSU) and a vehicle, and monitors in real-time weather conditions and road surface conditions. In addition, by dynamically determining an automation level (following the Automation Level of SAE) according to the multi-layer operational design domain, autonomous driving is maximally maintained without switching to manual driving even in bad weather conditions (rain, snow, fog, or the like) and irregular road conditions (lane obscuration due to construction and bad weather, or the like).

According to embodiments of the present disclosure, a radar-type (radar precipitation sensor/smart disdrometer) weather sensor and a Lidar-type (present weather and visibility sensors) weather sensor are utilized for weather detection. The radar-type weather sensor is small in size, so it can always be installed in a vehicle, and the Lidar-type weather sensor is large in size, but it can measure the visibility distance. An autonomous driving system according to embodiments of the present disclosure uses a Lidar-type weather sensor for collecting bad weather learning data and being installed in an infrastructure edge RUS, and uses a radar-type weather sensor for monitoring weather conditions during driving.

Even when using a weather sensor or automatically recognizing and determining whether the current situation is within an operational design domain using a sensor-based weather recognition algorithm, there is a problem in that autonomous driving is stopped because the control is transferred or a minimum risk maneuver is performed even though an autonomous driving state can be maintained when a specific condition is satisfied according to the single-layer operational design domain structure.

According to embodiments of the present disclosure, when a maximum autonomous driving maintenance mode is selected by a driver's preference setting, autonomous driving is maximally maintained based on a multi-layer operational design domain and a dynamic automation level. An automation level described in the embodiment of the present disclosure follows an automation level defined by society of automotive engineers (SAE).

While the related art defines a fixed automation level and an operational design domain, the autonomous driving system according to embodiments of the present disclosure defines an automation level-based multi-layer operational design domain that dynamically changes depending on driving environments. According to the embodiment of the present disclosure, by defining a hierarchical operational design domain and establishing an autonomous driving strategy even within each automation level, an autonomous driving strategy that can maximally maintain autonomous driving is determined.

FIG. 1 illustrates an automation level according to embodiments of the present disclosure.

Referring to FIG. 1, an autonomous driving system according to embodiments of the present disclosure supports autonomous driving level 2 being a minimum automation level to autonomous driving level 4 being a maximum automation level. Each autonomous driving level hierarchically includes a normal automated driving mode and a degraded automated driving mode.

In each autonomous driving level, the degraded automated driving mode may be included as a single mode or as a plurality of modes (for example, degraded automated driving mode 1, degraded automated driving mode 2, and degraded automated driving mode 3).

A dynamic automation level and a multi-layer automated driving mode according to embodiments of the present disclosure are determined by monitoring in real-time a multi-layer operational design domain definition defined by an autonomous driving system developer and user's preference setting conditions.

According to embodiments of the present disclosure, the autonomous driving system monitors in real-time whether a multi-layer operational design domain is satisfied and performs control so that hierarchical autonomous driving is performed at an automation level at which conditions satisfied. The lower the automation level, the greater the driver's attention and intervention in emergency situations are required, and the higher the automation level, the greater the responsibility for automated response by a system.

Figure 2:
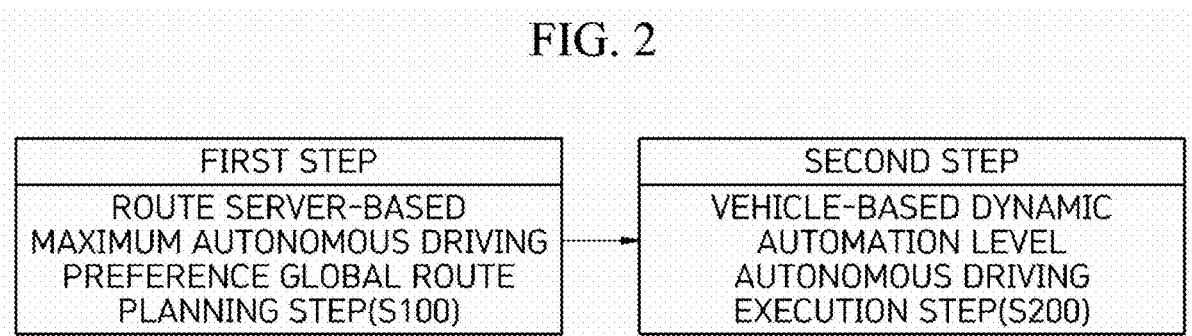
FIG. 2 illustrates a dynamic automation level-based autonomous driving process according to embodiments of the present disclosure.

FIG. 2 illustrates a dynamic automation level-based autonomous driving process according to embodiments of the present disclosure.

A dynamic automation level-based autonomous driving method according to embodiments of the present disclosure includes a route server-based maximum autonomous driving preference global route planning step S100 and a vehicle-based dynamic automation level autonomous driving execution step S200. The route server-based maximum autonomous driving preference global route planning step S100 plans a global route so that a route server has as many sections as possible of autonomous driving. That is, it is different from planning a shortest distance route and a minimum time route according to the related art. The vehicle-based dynamic automation level autonomous driving execution step S200 is a step in which an autonomous vehicle dynamically changes an automation level according to a driving situation monitoring result and maximally maintains autonomous driving while driving along the global route received from the route server.

Route Server-based Maximum Autonomous Driving Preference Global Route Planning Step S100

The route server generates operational design domain determination information by using information continuously received from infrastructure edge RSUs, preceding autonomous driving vehicles, and external agency servers (for example, Korea meteorological administration server, Korea expressway corporation server, and the like) in which weather sensors are installed, and records related location information in a precision map. The operational design domain determination information is generated using weather information, construction information, road surface condition information, and the like.

When a destination is designated through HMI in an autonomous vehicle, destination information and hierarchical operational design domain definition information are transmitted to the route server and a maximum autonomous driving preference global route plan is requested.

The route server may use a route planning algorithm, but when calculating a link cost during a route search, the route server may calculate a route using Equation 1 below and search for a global route in which autonomous driving is maximally preferenced.

$$C_{DL} = W_{DL}(\text{odd, link}) * C_{link} \qquad \text{Equation 1}$$

where $W_{DL}(\text{odd,link})=\{W_{Lv}|W_{Lv4}, W_{Lv3}, W_{Lv2}, W_{man}\}$
$W_{Lv4} < W_{Lv3} < W_{Lv2} < W_{man}$ The cost CDL of a link is calculated by multiplying $C_{link}$, which indicates the existing cost value such as the distance and time of the link, by an automation level weight function $W_{DL}$.

The weight $W_{DL}$ is a function that determines an automation level by utilizing multi-layer operational design domain definition information transmitted from the autonomous vehicle and operational design domain determination information such as weather and construction information maintained by the route server, and returns weight values for the determined automation level.

The returned weight values $W_{Lv4}, W_{Lv3}, W_{Lv2}, W_{man}$ have smaller values as the automation level (number in the subscript) increases.

The automation level for each link in the route server-based maximum autonomous driving preference global route planning step S100 is an expected automation level determined only using information in the route server, which may change as the autonomous vehicle actually drives on the road.

Links in the global route transmitted to the autonomous vehicle are displayed to a driver together with the expected automation level for each link, and thus, the driver may predict in advance what level of autonomous driving will be performed in which section. Accordingly, the driver's responsiveness may be improved in autonomous driving situations.

Vehicle-based Dynamic Automation Level Autonomous Driving Execution Step S200

In the vehicle-based dynamic automation level autonomous driving execution step S200, the autonomous vehicle receives the global route calculated through the route server-based maximum autonomous driving preference global route planning step S100, and then actually performs dynamic automation level-based autonomous driving.

The autonomous vehicle drives along the global route, performs real-time monitoring regarding whether a corresponding operational design domain is satisfied by additionally utilizing the definition of the multi-layer operational design domain and the weather sensor installed in the autonomous vehicle, and performs autonomous driving by changing the automation level when automation conditions are changed.

Hereinafter, the dynamic automation level-based autonomous driving method according to embodiments of the present disclosure is described with reference to FIGS. 3 to 6.

Figure 3:
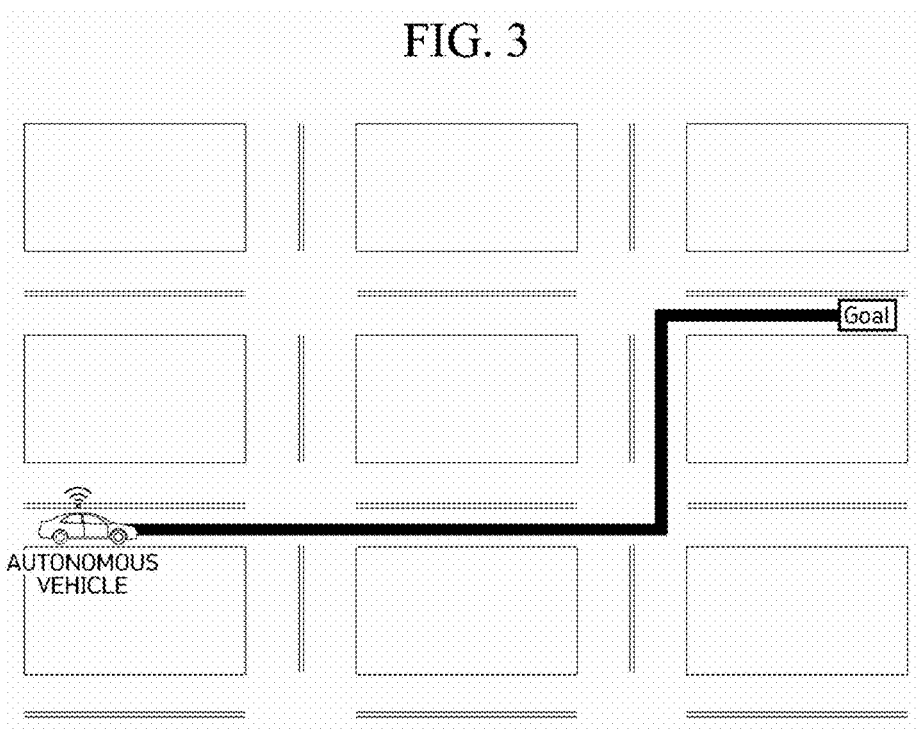
FIG. 3 illustrates the result of performing global route search in a route server according to the related art.

FIG. 3 illustrates the result of performing global route search in a route server according to the related art.

The autonomous driving system according to the related art does not confirm whether autonomous driving is possible, and simply searches for a route based on the minimum time or the shortest distance expected to reach a destination.

Figure 4:
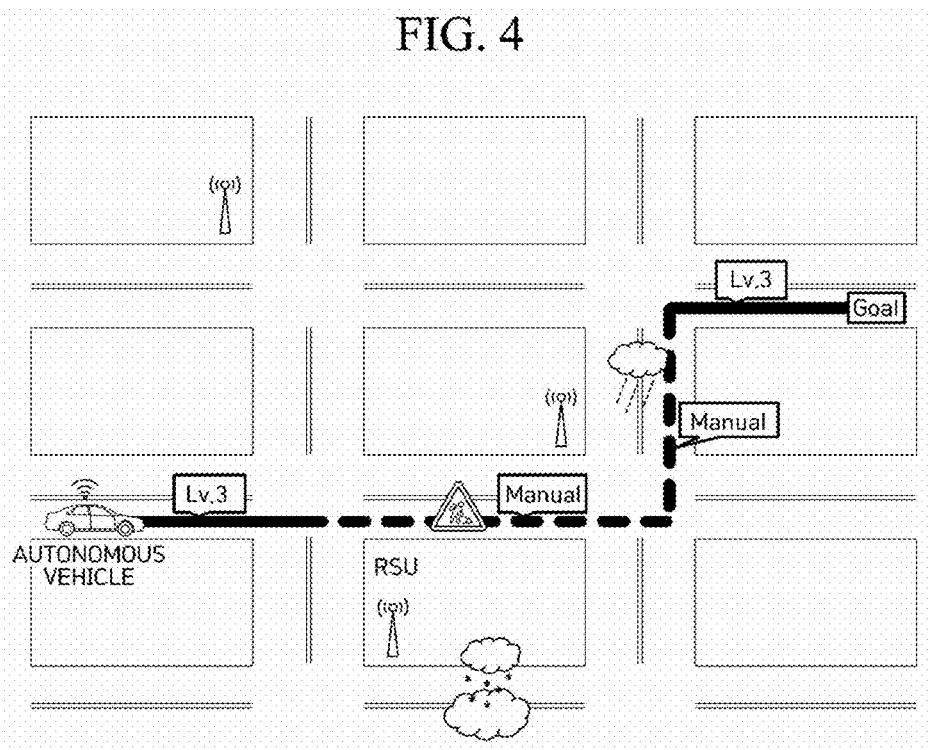
FIG. 4 illustrates an expected automation level when autonomous driving is actually performed along a global route planned in FIG. 3.

FIG. 4 illustrates an expected automation level when autonomous driving is actually performed along a global route planned in FIG. 3.

An autonomous vehicle is a vehicle that supports automation level 3, and an example of determining that the vehicle exits an operational design domain in a construction section and bad weather conditions is described.

Referring to FIG. 4, the autonomous vehicle starts driving at the autonomous driving level 3 from a starting position, transfers control to a driver due to exit from an operational design domain when entering a construction section in front of the autonomous vehicle, and enters a manual driving mode Manual. When it rains locally in a section where it turns left after passing the construction section, it is determined to have exited the operational design domain and continues manual driving Manual. When the driving environment returns to the normal driving environment on the right turn route, the autonomous vehicle performs autonomous driving again (autonomous driving level 3) and reaches the destination.

Figure 5:
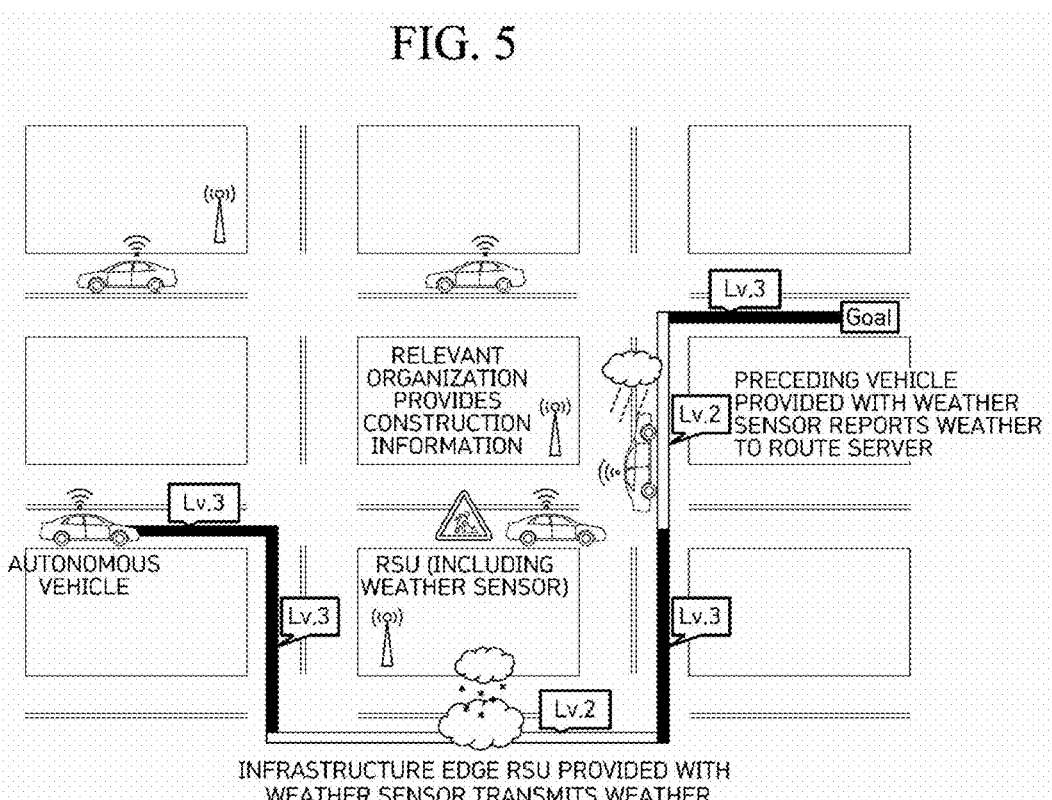
FIG. 5 illustrates a route server-based maximum autonomous driving preference global route plan according to embodiments of the present disclosure.

FIG. 5 illustrates a route server-based maximum autonomous driving preference global route plan according to embodiments of the present disclosure.

According to embodiments of the present disclosure, an infrastructure edge RSU provided with a weather sensor transmits weather information (snowing) and road surface information to the route server. The weather information (raining) ahead is transmitted from a preceding vehicle provided with the weather sensor to the route server. Construction-related information is transmitted from a relevant organization to the route server.

It is assumed that an autonomous vehicle is a vehicle that performs dynamic automation level-based autonomous driving, and supports automation levels 2 and 3 (automation level and autonomous driving level are used as having the same meaning), is determined to have exited the operational design domain when entering a construction section, and can drive at the automation level 2 in the case of bad weather.

Referring to FIG. 5, a global route different from the global route illustrated in FIG. 4 is searched, which is because the autonomous vehicle avoids a construction section when it is determined to exit the operational design domain. That is, when searching for the global route, the route server excludes a corresponding route from the route search because the weight of the link cost for manual driving is high.

As illustrated in FIG. 5, since autonomous driving may be continued at the automation level 2 in snowy and rainy sections, an automated driving mode may be continuously used to reach a destination.

When no dynamic automation level is supported, in order to drive in bad weather (rain), the overall automation level needs to be lowered from level 3 to level 2, or, as illustrated in FIG. 4, no autonomous driving is continuously performed because the autonomous vehicle is determined to exit the operational design domain.

According to other embodiments of the present disclosure, a driving route that passes through a construction section, rather than avoiding the construction section, may be planned using information on the construction section. For example, when the construction section is a full road resurfacing project and lanes are completely erased, the driving route may be planned to avoid the construction section as described above. On the other hand, when only one specific lane is controlled in a construction section, it is possible to plan the driving route to pass through the construction section under the determination that it is possible to pass through the construction section by lowering the automation level to the automation level 2. That is, rather than simply avoiding a construction section, a driving route plan regarding whether to pass through or avoid the construction section may be established based on detailed information on the construction section. In addition, by sharing not only detailed information on the construction section but also driving behavior information of preceding vehicles, when, for example, driving in lanes 2 and 3 is required because lane 1 is controlled, it is possible to establish the route plan so that the autonomous vehicle changes its driving lane to the lane 2 and 3 in advance and passes through the section.

Figure 6:
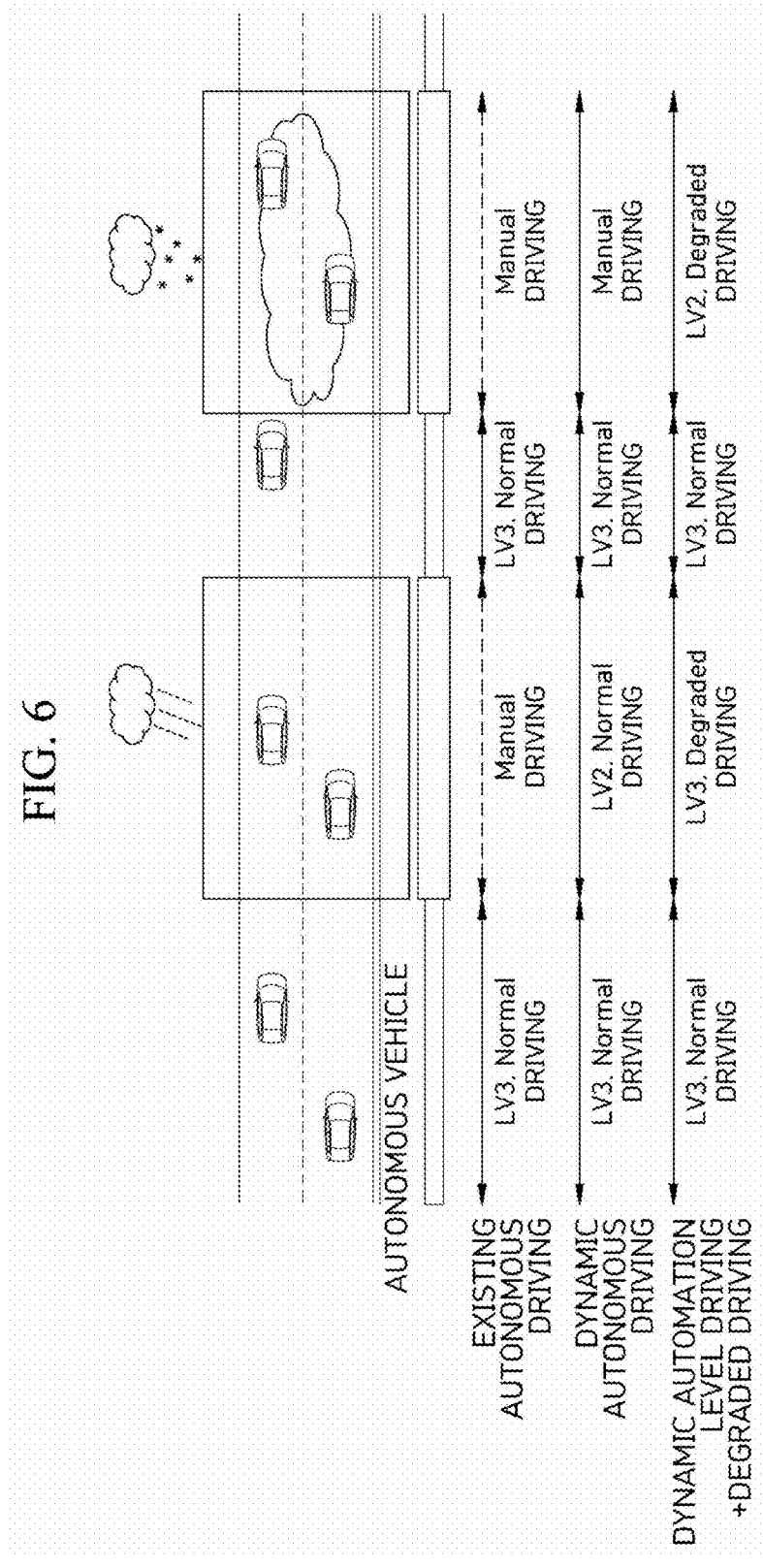
FIG. 6 illustrates execution of vehicle-based dynamic automation level autonomous driving according to embodiments of the present disclosure.

FIG. 6 illustrates execution of vehicle-based dynamic automation level autonomous driving according to embodiments of the present disclosure.

It is assumed that an autonomous vehicle is not able to perform normal level 3 autonomous driving in bad weather and can perform autonomous driving when certain conditions are satisfied in a situation where light rain is falling.

In an existing autonomous vehicle, autonomous driving is stopped because the autonomous vehicle is determined to exit an operational design domain in bad weather.

When an autonomous vehicle supports a dynamic automation level, autonomous driving is performed at automation level 2 in the case of light rain, and manual driving is performed in the case of light snow.

An autonomous vehicle according to embodiments of the present disclosure can support dynamic automation level and degraded automated driving and perform degraded driving at a higher automation level in rainy or snowy situations, thereby reducing the burden on a driver. That is, when it rains, the autonomous vehicle performs degraded automated driving while maintaining level 3, and when it snows, the autonomous vehicle performs level 2 degraded automated driving instead of switching to manual driving, thereby maximally maintaining autonomous driving while driving. Since the responsibility of a driver is different in case of accidents at level 3 and level 2, autonomous driving is maximally maintained while driving to reduce the responsibility of the driver in case of an accident, which can have a positive effect on the market application of autonomous vehicles.

Figure 7:
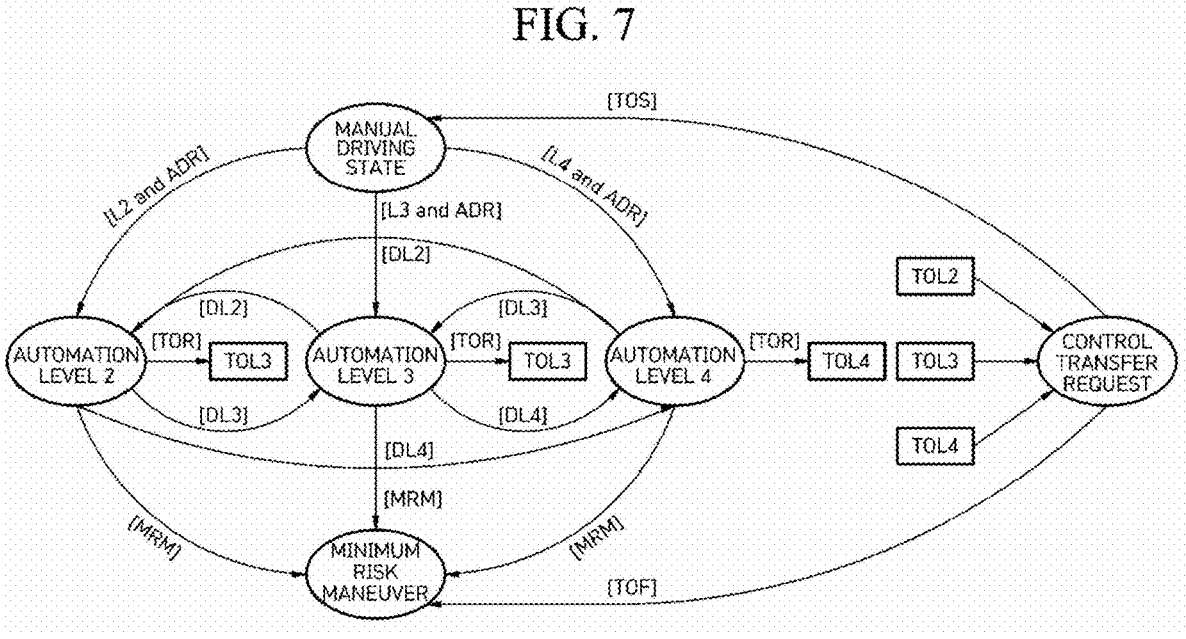
FIG. 7 illustrates a state transition diagram for determining a dynamic automation level-based autonomous driving strategy according to embodiments of the present disclosure.

FIG. 7 illustrates a state transition diagram for determining a dynamic automation level-based autonomous driving strategy according to embodiments of the present disclosure.

A manual driving state Manual Driving refers to a manual driving state by a driver, and an autonomous driving level (Automation Level) 2, an autonomous driving level (Automation Level) 3, and an autonomous driving level (Automation Level) 4 refer to autonomous driving states by automation levels. The autonomous driving level may vary depending on the capabilities of an autonomous driving system.

A control transfer request Take Over refers to a state in which the control transfer is requested in the case of a driving situation in which an autonomous vehicle exits an operational design domain at the autonomous driving level (Automation Level) 2 or the autonomous driving level (Automation Level) 3.

A minimum risk maneuver (MRM) refers to a state in which a minimum risk maneuver, such as an emergency stop or shoulder stop, is performed when a driver accepts no control transfer request.

Table 1 below shows detailed conditions for the transfer for each state.

TABLE 1

| Condition code | Condition description | Detailed condition |
|---|---|---|
| ADR | Automated Driving Request | ADR-Flag |
| L2 | Automation Level 2 is possible | (ODD-L2-ND) or (ODD-L2-DD and UP-DD) |
| L3 | Automation Level 3 is possible | (ODD-L3-ND) or (ODD-L3-DD and UP-DD) |
| L4 | Automation Level 4 is possible | (ODD-L4-ND) or (ODD-L4-DD and UP-DD) |
| DL2 | Dynamic Automation Level 2 is possible | !L4 and !L3 and L2 and UP-DL |
| DL3 | Dynamic Automation Level 3 is possible | !L4 and !L3 and UP-DL |
| DL4 | Dynamic Automation Level 4 is possible | L4 and UP-DL |
| TOR | Take Over Request | TOR-Flag |
| TOS | Take Over Success | TOS-Flag |
| TOF | Take Over Fail | TOF-Flag |
| MRM | Minimum Risk Maneuver | ODD-EXIT or ADS-FAIL or VEH-FAIL |

The autonomous driving system monitors in real-time which automation level is currently possible (that is, L2, L3, L4 conditions) and displays an automation level, which is possible in the current driving situation, through the HMI.

When a driver sets a destination and selects a desired automation level, the state is transferred to the selected automation level and autonomous driving is started.

When driving at the current automation level is not possible during autonomous driving and the condition (DL2, DL3, or DL4) requiring transfer to another automation level is satisfied, the state is transferred to another automation level state and autonomous driving continues at the transferred automation level.

When autonomous driving is not possible, the system requests a driver to transfer driving control (TOR) or transfers the state of the vehicle to a minimum risk maneuver state and performs a corresponding driving behavior.

When the driver accepts the driving control transfer request (TOS condition), the system transfers the state of the vehicle to a manual driving state, and when the driver does not accept the driving control transfer request (TOF condition), the system transfers the state of the vehicle to the minimum risk maneuver state.

Table 2 below shows detailed state transfer conditions.

TABLE 2

| Detailed condition code | Condition description |
|---|---|
| UP-DD | User Preference-Degraded Driving |
| UP-DL | User Preference-Dynamic automation Level Driving |
| ODD-L2-ND | Normal Driving operation is possible at Level 2 Automation Level & ODD is satisfied |
| ODD-L3-ND | Normal Driving operation is possible at Level 3 Automation Level & ODD is satisfied |
| ODD-L4-ND | Normal Driving operation is possible at Level 4 Automation Level & ODD is satisfied |
| ODD-L2-DD | Degraded Driving operation is possible at Level 2 Automation Level & ODD is satisfied |
| ODD-L3-DD | Degraded Driving operation is possible at Level 3 |

TABLE 2-continued

| Detailed condition code | Condition description |
| --- | --- |
| | Automation Level & ODD is satisfied |
| ODD-L4-DD | Degraded Driving operation is possible at Level 4 Automation Level & ODD is satisfied |
| ADR-Flag | User's Automated Driving Request setting (request of start of Automated Driving through HMI) |
| TOR-Flag | System's Take Over Request setting (when ODD-EXIT is predicted) |
| TOS-Flag | Take Over Success setting (when user takes over control in given condition) |
| TOF-Flag | Take Over Fail setting (when user does not take over control in given condition) |
| ODD-EXIT | When exiting given ODD condition |
| ADS-FAIL | Fail of ADS (Automated Driving System) such as sensor, computer, and automated driving SW |
| VEH-FAIL | Vehicle device fail (steering, acceleration/deceleration function, etc.) |

The driver uses the HMI to set whether to use the dynamic automation level function (UP-DL) or to use the degraded autonomous driving function (UP-DD) at each automation level.

Based on the driver's setting, the autonomous driving system performs driving behavior prediction and reflects the driver's preference.

The autonomous driving system monitors in real-time whether normal autonomous driving is possible (ODD-L2-ND, ODD-L3-ND, ODD-L4-ND detailed conditions) or whether degraded autonomous driving is possible (ODD-L2-DD, ODD-L3-DD, ODD-L4-DD detailed conditions) for each automation level.

As other detailed conditions, there are autonomous driving request flag (ADR-Flag detailed condition), control transfer request flag (TOR-Flag detailed condition), and control transfer acceptance flag (TOS-Flag, TOF-Flag detailed condition), and there are operational design domain exit (ODD-EXIT detailed condition), autonomous driving system fail (ADS-FAIL), and vehicle fail (VEH-FAIL) that are conditions for minimum risk maneuver triggering.

Figure 8:
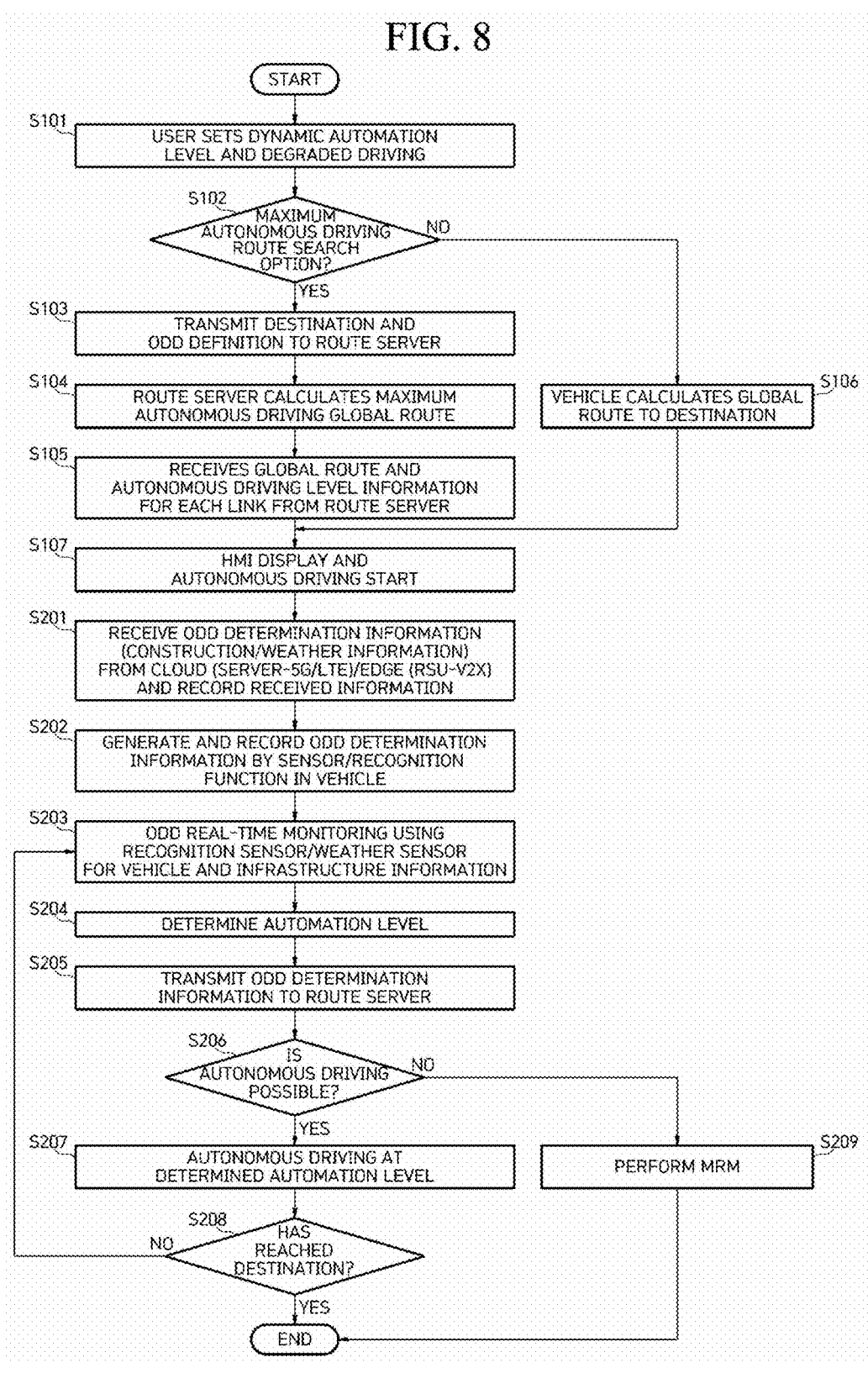
FIG. 8 illustrates a dynamic automation level-based autonomous driving method according to embodiments of the present disclosure.

FIG. 8 illustrates a dynamic automation level-based autonomous driving method according to embodiments of the present disclosure.

A driver or a user of an autonomous driving system sets whether to activate a dynamic automation level and a degraded automated driving function through the HMI (S101). When no function is set, a fixed automation level-based autonomous driving function is performed.

In order to perform autonomous driving, the driver sets a destination, selects an autonomous driving route search option, and confirms whether a maximum autonomous driving route search option is selected (S102). When the maximum autonomous driving route search option is not selected, the autonomous driving system of a vehicle calculates a global route to the destination (S106). When the maximum autonomous driving route search option is selected, the autonomous driving system of the vehicle transmits destination information and operational design domain definition information to the route server (S103).

The route server generates operational design domain determination information based on weather information and irregular road information, and searches for a global route by using a cost calculation logic (S104).

The autonomous driving system of the vehicle receives a set of {link, automation level}, which is the result value of the global route, from the route server (S105), and starts autonomous driving after displaying the route and automation level through the HMI (S107).

Like the route server, the autonomous driving system of the vehicle continuously receives operational design domain determination information from a cloud and an edge, and records the operational design domain determination information for each corresponding location on a precision map (S201).

In addition, the autonomous driving system generates and records operational design domain determination information by utilizing sensor information acquired using sensors installed in the vehicle and recognition functions (S202).

The autonomous driving system continuously monitors the operational design domain by using recognition sensors and weather sensors installed in the vehicle, and infrastructure (cloud and edge) information (S203).

The autonomous driving system evaluates the conditions of automation levels by using the operational design domain definition information, and determines an automation level (S204).

After determining the automation level, the autonomous driving system transmits the operational design domain determination information to the route server (S205), thereby supporting that the operational design domain determination information is used when following vehicles request maximum autonomous driving preference global route search.

The autonomous driving system determines whether autonomous driving is possible as a result of the automation level determination (S206). When the autonomous driving is not possible, the autonomous driving system activates the minimum risk maneuver (S209).

When the autonomous driving is possible, the autonomous driving system detects a change in the automation level, and performs an autonomous driving operation suitable for a state transition and each automation level when there is a change in the automation level (S207).

The autonomous driving system confirms whether the vehicle has reached the destination (S208), and terminates the autonomous driving.

Figure 9:
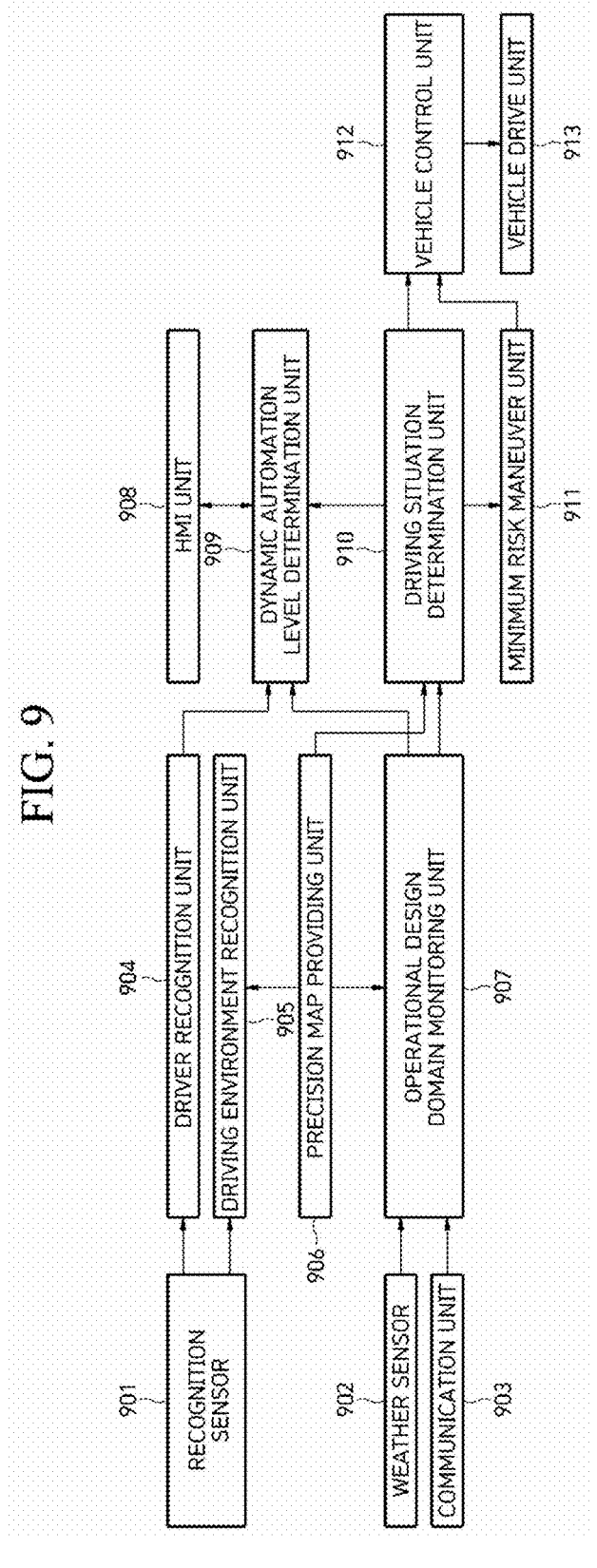
FIG. 9 illustrates a dynamic automation level-based autonomous driving system according to embodiments of the present disclosure.

FIG. 9 illustrates a dynamic automation level-based autonomous driving system according to embodiments of the present disclosure.

A recognition sensor 901 includes a sensor installed in an autonomous vehicle, and includes GPS, radar, Lidar, and a camera.

A weather sensor 902 is a sensor for detecting weather types, precipitation, snowfall, visibility distance, road conditions, and the like, and includes a radar precipitation sensor, a present weather and visibility sensor, a runway and road sensor, and a sensor cleaning module for removing contaminants from a sensor surface.

A communication unit 903 includes a V2X modem for communicating with an infrastructure edge RSU and an LTE/5G modem for communicating with a cloud.

A driver recognition unit 904 monitors the driver's status (drowsiness, line of sight, distraction, and the like) for transferring driving control.

A driving environment recognition unit 905 receives location, object (pedestrian, vehicle), traffic light, lane, and drivable area information acquired using the recognition sensor, and transmits the received information to a driving situation determination unit 910.

A precision map providing unit 906 includes a database that stores a precision map, and stores/manages and provides lane-level road network data.

An operational design domain monitoring unit 907 monitors in real-time weather, road conditions, construction information, vehicle conditions, V2X information, and recognition performance, and generates operational design domain determination information. The operational design domain monitoring unit 907 also performs a monitoring function of detecting whether rain, snow, or pollutants exist on the sensor surface.

A HMI unit 908 provides an interface for performing interaction with a driver, such as transmitting a global route, an autonomous driving state, and driving control transfer information, and manages a dynamic automation level and a degraded automated driving-related preference setting.

A dynamic automation level determination unit 909 determines an automation level and a driving function level in a current driving situation by using the setting values of the operational design domain monitoring unit 907 and the HMI unit 908 and multi-layer operational design domain definition information.

The driving situation determination unit 910 performs global route planning, surrounding object route prediction, risk determination, driving situation determination, and local route planning in order to perform autonomous driving.

A minimum risk maneuver unit 911 determines a minimum risk maneuver instead of the driving situation determination unit 910 in a situation where autonomous driving is not possible, and controls the vehicle.

A vehicle control unit 912 controls a vehicle drive unit 913 for local route following, and the vehicle drive unit 913 includes modules for actually driving the vehicle such as a steering wheel, an engine, a brake, a gear, and a pump.

Hereinafter, with reference to FIGS. 10 to 12, the definition of the multi-layer operational design domain according to embodiments of the present disclosure is described.

The operational design domain definition information is information set in advance according to the recognition, determination, and control capabilities of the autonomous driving system, and is continuously monitored during driving.

FIG. 10 illustrates operational design domain definition information in an automation level 3 normal function. This corresponds to ODD-L3-ND in Table 2 above.

Referring to FIG. 10, normal driving at a corresponding level is possible only on asphalt, and driving is not possible on dirt roads. In addition, driving is possible only on roads with clearly drawn lanes, not on construction sections. In addition, normal autonomous driving at level 3 is possible only when precipitation and snowfall are each 10 mm/h or less in terms of weather conditions.

FIG. 11 illustrates operational design domain definition information indicating conditions in which degraded driving is possible at automation level 3. This corresponds to ODD-L3-DD in Table 2 above.

Referring to FIG. 11, unlike the definition in FIG. 10, even when the precipitation is 10 to 30 mm/h, autonomous driving may be performed at level 3 by limiting the speed of a vehicle to 80% of the normal speed.

FIG. 12 illustrates operational design domain definition information indicating conditions in which degraded driving is possible at automation level 2. This corresponds to ODD-L2-ND in Table 2 above.

Referring to FIG. 12, autonomous driving may be performed even when the road is unpaved, in a construction section, on a road where lanes are not visible, when the precipitation is 30 mm/h or less, or when the snowfall is 20 mm/h or less. In addition, the degraded function includes reduced speed, no lane changes, or the like.

Figure 13:
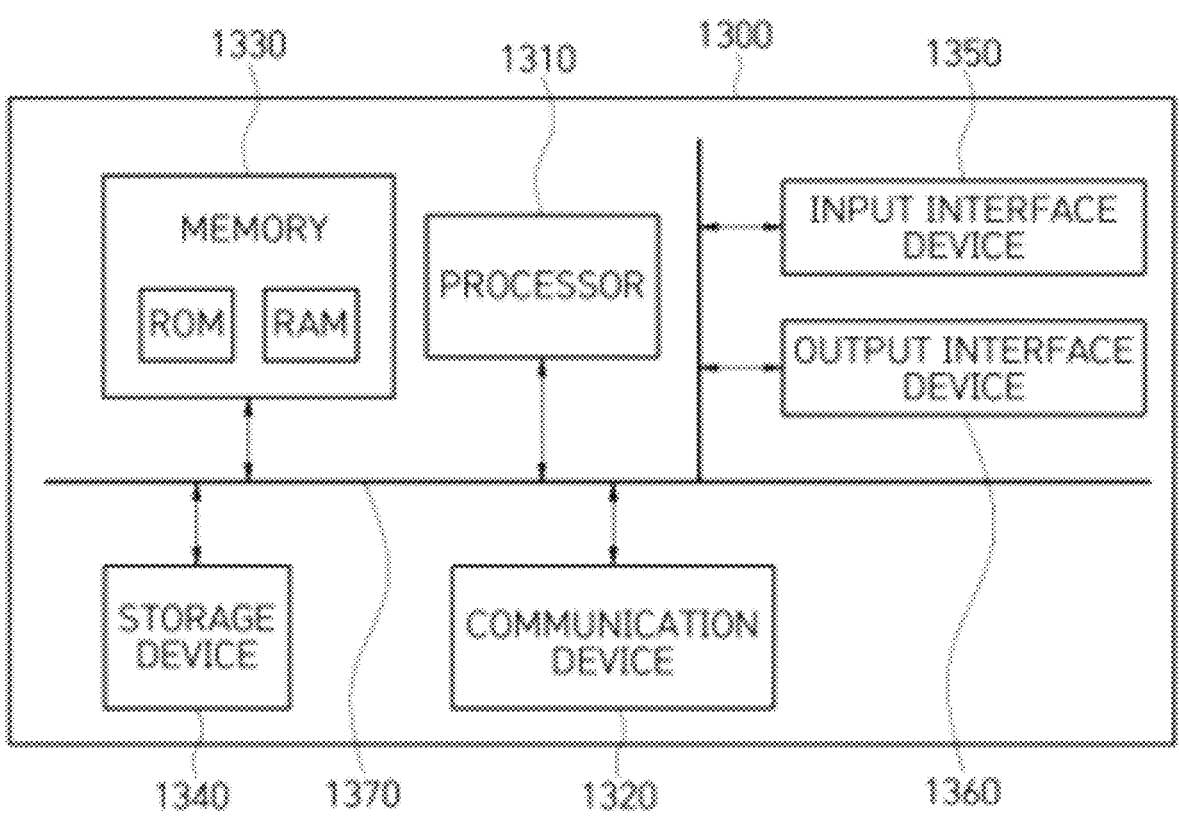
FIG. 13 is a block diagram illustrating a computer system for implementing a method according to embodiments of the present disclosure.

FIG. 13 is a block diagram illustrating a computer system for implementing the method according to embodiments of the present disclosure.

Referring to FIG. 13, a computer system 1300 may include at least one of a processor 1310, a memory 1330, an input interface device 1350, an output interface device 1360, and a storage device 1340 that communicate with one another through a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or nonvolatile storage media. For example, the memory may include a read only memory (ROM) and a random access memory (RAM). In embodiments of the present disclosure, the memory may be located inside or outside the processor, and may be connected to the processor through various known means. The memory is various forms of volatile or nonvolatile storage media, and for example, may include a read-only memory (ROM) or a random access memory (RAM).

Accordingly, embodiments of the present disclosure may be implemented as a computer-implemented method or a non-transitory computer-readable medium storing computer-executable instructions. In an embodiment, when executed by a processor, computer readable instructions may perform a method according to at least one aspect of the present disclosure.

The communication device 1320 may transmit or receive wired signals or wireless signals.

The method according to embodiments of the present disclosure may be implemented in the form of program instructions that can be executed through various computer means, and recorded on a computer-readable medium.

The computer-readable medium may include program instructions, data files, data structures, and the like singly or in combination. The program instructions recorded on the computer-readable medium may be specially designed and configured for embodiments of the present disclosure, or may be known to and usable by those skilled in the art of computer software. A computer-readable recording medium may include a hardware device configured to store and execute program instructions. Examples of the computer-readable recording medium may include magnetic media such as hard disks, floppy disks, and magnetic tapes, optical media such as CD-ROMs and DVDs, and magneto-optical media such as floptical disks, a ROM, a RAM, and a flash memory. The program instructions may include not only machine language code such as that generated by a compiler, but also high-level language code that can be executed by a computer through an interpreter or the like.

Although the embodiments of the present disclosure have been described in detail above, the scope of the present disclosure is not limited thereto, and various modifications and improvements made by those skilled in the art using the basic concept of the present disclosure defined in the following claims are included in the scope of the present disclosure.

What is claimed is:

1. A dynamic automation level-based autonomous driving system comprising:

a route server configured to generate operational design domain determination information and to plan a global route so that an automated driving mode is preferenced; and an autonomous vehicle configured to drive along the global route, to change automation levels by using multi-layer operational design domain definition information and driving situation monitoring information, and to perform autonomous driving, wherein the route server receives the multi-layer operational design domain definition information and destination information from the autonomous vehicle and plans the global route, wherein the route server generates the operational design domain determination information using basic information received from at least one of an infrastructure edge roadside unit (RSU), a preceding vehicle, and an external agency server, the basic information including at least one of weather information, road construction information, and road surface condition information, wherein the route server calculates a link cost by multiplying an existing cost value of a link including distance or travel time by an automation level weight function determined based on the multi-layer operational design domain definition information and the operational design domain determination information, wherein the route server transmits information on the global route including an expected automation level corresponding to each link to the autonomous vehicle, and wherein the autonomous vehicle monitors in real time whether a current driving situation falls within an operational design domain using a weather sensor installed in the autonomous vehicle and changes the automation level when automation conditions are changed.

2. The dynamic automation level-based autonomous driving system of claim 1, wherein the route server transmits an expected automation level for each link to the autonomous vehicle.

3. The dynamic automation level-based autonomous driving system of claim 1, wherein, when it is confirmed that automation conditions are changed, the autonomous vehicle performs autonomous driving by changing the automation levels.

4. The dynamic automation level-based autonomous driving system of claim 1, wherein the autonomous vehicle performs autonomous driving by determining a degraded automated driving mode set for each of the automation levels.

5. A dynamic automation level-based autonomous driving method performed by a dynamic automation level-based autonomous driving system, comprising:

(a) planning, by a route server, a global route so that an automated driving mode is preferenced; and (b) monitoring, by an autonomous vehicle, a driving situation while driving along the global route, and performing autonomous driving while changing an automation level in consideration of a multi-layer operational design domain, wherein the planning of the global route includes generating operational design domain determination information using weather information and irregular road information and planning the global route using a cost calculation logic, wherein the planning of the global route includes calculating a link cost by multiplying an existing link cost by an automation level weight determined according to the multi-layer operational design domain definition information and the operational design domain determination information, wherein the monitoring of the driving situation includes determining the automation level using weather information acquired using a weather sensor installed in the autonomous vehicle, road information acquired using a recognition sensor installed in the autonomous vehicle, weather information received from an infrastructure, and road information received from the infrastructure, and wherein the autonomous driving is performed by determining a degraded automated driving mode preset for each automation level.

6. The dynamic automation level-based autonomous driving method of claim 5, wherein, in (b), the automation level is determined using weather information acquired using a weather sensor installed in the autonomous vehicle, road information acquired using a recognition sensor installed in the autonomous vehicle, weather information received from an infrastructure, and road information received from the infrastructure.

7. The dynamic automation level-based autonomous driving method of claim 6, wherein, in (b), the determined automation level is transmitted to the route server to be used for a route search request of a following vehicle.

8. The dynamic automation level-based autonomous driving method of claim 5, wherein, in (b), the autonomous driving is performed by determining a degraded automated driving mode set in advance in relation to the automation level.

9. A dynamic automation level-based autonomous vehicle comprising:

an input unit configured to receive global route information;

a memory configured to store a program for performing autonomous driving by using the global route information; and a processor configured to execute the program, wherein the processor determines an automation level and whether to execute a degraded automated driving mode according to a result of determining an operational design domain monitored in a process of performing the autonomous driving, wherein the input unit receives weather information and road condition information acquired by at least one sensor installed in the autonomous vehicle and weather information and road information received from an external infrastructure, wherein the processor generates an operational design domain determination result using the weather information and the road condition information, wherein the processor transmits the operational design domain determination result to a route server having transmitted the global route information, wherein the processor monitors in real time whether a current driving situation falls within an operational design domain using a weather sensor installed in the autonomous vehicle and changes the automation level when automation conditions are changed, and wherein the processor determines whether to execute the degraded automated driving mode according to the operational design domain determination result.

10. The dynamic automation level-based autonomous vehicle of claim 9, wherein the processor determines whether to execute the degraded automated driving mode that prohibits a lane change function, by using the operational design domain determination result.

* * * * *